United States Patent [19]
Adar et al.

[11] Patent Number: 5,802,515
[45] Date of Patent: Sep. 1, 1998

[54] RANDOMIZED QUERY GENERATION AND DOCUMENT RELEVANCE RANKING FOR ROBUST INFORMATION RETRIEVAL FROM A DATABASE

[75] Inventors: Eytan Adar, Boston; Mitchell N. Charity, Cambridge, both of Mass.

[73] Assignee: Massachusetts Institute of Technology, Cambridge, Mass.

[21] Appl. No.: 661,591

[22] Filed: Jun. 11, 1996

[51] Int. Cl.⁶ .................................................. G06F 17/30
[52] U.S. Cl. .................................. 707/5; 707/3; 707/4
[58] Field of Search .................................. 707/5, 3, 4

[56] References Cited

U.S. PATENT DOCUMENTS

| | | | |
|---|---|---|---|
| 4,290,105 | 9/1981 | Cichelli et al. | 707/5 |
| 5,404,507 | 4/1995 | Bohm et al. | 395/600 |

OTHER PUBLICATIONS

Wang et al., "LITREF—A Microcomputer Based Information Retrieval System Supporting Stroke Diagnosis, Design and Development", Proceedings. Second Annual IEEE Symposium on Computer–Based Medical Systems, 26–27 Jun. 1989, Minneapolis, Minnesota, pp. 46–51.

Papakonstantinou et al., "Object Exchange Across Heterogeneous Information Sources", Proceesings of the Eleventh International Conference on Data Engineering, 6–10 Mar. 1995, Taipei, Taiwan, pp. 251–260.

"An algorithm for weighted searching on a Boolean system", Bovey et al., Information Technology, vol. 3, No. 2, Apr. 1984, pp. 84–87.

"Annual Progress Report", Library 2000, Jul. 1, 1993–Jun. 30, 1994, pp. 1–8, available on line at: http://ltt-www.lcs.mit.edu/ltt-www/Papers/1994.annual.html.

"On-the-fly Hyperlink Creation for Page Images", Adar et al., Digital Libraries '95 Proceedings, Jun. 11–13, 1995, pp. 173–176.

"Laboratory for Computer Science Progress Report 31", Massachusetts Institute of Technology, Jul. 1993–Jun. 1994, Library 2000, one unnumbered cover page, second page numbered 3, third unnumbered page, and pp. 154–163.

"Library 2000 Quarterly Progress Report, Apr. 1–Jun. 30, 1994", Quarterly Progress Report, pp. 1–4, available on–line at: http://ltt-www.lcs.mit.edu/ltt-www/Papers/1994.4qpr.html.

"Probabilistic Methods For Ranking Output Documents In Conventional Boolean Retrieval Systems*", Radecki, Information Processing & Management vol. 24, No. 3, pp. 281–302, 1988.

*Primary Examiner*—Thomas G. Black
*Assistant Examiner*—Paul R. Lintz
*Attorney, Agent, or Firm*—Nutter, McClennen & Fish, LLP; Christopher S. Daly, Esq.

[57] ABSTRACT

A method and apparatus for randomly selecting terms from an input string to form a plurality of search queries is described. Each of the plurality of search queries can be provided to a database to locate database entries in the database. Database entries returned from a database search using the plurality of search queries may be ordered to provide a relevance ranked list of the database entries.

21 Claims, 4 Drawing Sheets

Figure 4

RANDOMIZED QUERY GENERATION AND DOCUMENT RELEVANCE RANKING FOR ROBUST INFORMATION RETRIEVAL FROM A DATABASE

FIELD OF THE INVENTION

This invention relates generally to information retrieval systems and more particularly to methods and apparatus for generating query strings to search a database.

BACKGROUND OF THE INVENTION

As is known in the art, the term database typically refers to a collection of logically related data elements stored on one or more storage devices. Generally, information is stored in a database as a series of discrete database records which may, in turn, be divided into discrete fields (e.g., name, height, and weight). Thus, a database record or more simply a record, refers to a collection of data elements or words that are stored in the database. Records in the database can typically be searched and retrieved on the basis of the content of the fields (e.g., all people who weigh more than 150 lb).

As is also known, information retrieval systems are used to identify information in a database and subsequently retrieve the information from the database. The retrieved information can then be displayed upon request. Computers and data processing techniques have made possible the high-speed, selective retrieval of large amounts of information from databases in such diverse fields as banking, law enforcement, jurisprudence, and medicine.

There are several types of information-storage-and-retrieval systems. For example, in a document-retrieval system an entire document is stored for access. Identification and retrieval of such documents may be accomplished using a variety of techniques. For example, documents may be retrieved by using one or more key words which denote a category to which the documents belong.

Reference-retrieval systems store references to documents. References relevant to a particular request are retrieved and printed in a list. Often the list of returned references are placed in a particular order e.g from the most relevant document references to the least relevant document references. Such a system can therefore provide an index to literature from a wide variety of sources (e.g., books, periodicals, technical journals) on a particular subject (e.g. hypertension).

One such example of a reference-retrieval system occurs in identifying and subsequently retrieving documents such as technical reports given a document citation. Often such document citations are found in another document. For example, when reading a first technical document, it is relatively common to read a citation of a second document. In some cases, it may be desirable to locate, retrieve and read the second document.

One problem with locating a document by using a document citation, however, is the existence of a variety of different citation styles. Citation styles vary as to the particular form for author and publisher names, the particular manner in which dates are listed, etc. . . . In addition to the different citation styles, the document citation may contain typographical or other errors. For example, the document citation may be incorrect or incomplete. As a result, it is relatively difficult to determine whether a particular document is stored in a database solely from a document citation.

Several techniques exist for locating a document in a database from a document citation. For example, in one technique all punctuation marks, initials and abbreviations are removed from the document citation and the remaining terms in the document citation (e.g. names, dates, etc. . . . ) are provided to a database search interface as a search string. The database search interface searches the database for citations which include each of the terms in the search string. One problem with this approach, however, is that the slightest incongruity between the terms in the search string and the terms in the boolean database will result in the citation not being found in the database. For example, if a search string includes the terms "University of Illinois" and the citation is stored in a database as "Univ. of Illinois," then the search string will not locate the citation in the database. Furthermore, if one of the terms in the database or in the document citation is spelled incorrectly then the search will not locate the citation in the database.

Another technique for searching a database involves expanding the search string by generating abbreviations or modifications and other variations of a term and including all of the variations in the search string. For example, if a search string included the word "university" then the abbreviations such as "univ." or "univ" or "u of" may be added to the search string. This approach, however, is relatively complicated and time consuming since a relatively large number of variations of search terms must be generated.

Various approaches to searching databases have been tried in information retrieval including boolean searching. Boolean searching refers to a technique in which a search string or query is provided by connecting a plurality of terms by logical operators. Boolean searching is difficult to use because the inclusion of a single unfortunate term in the query can turn a viable query into an excessively narrow one i.e. a query which locates only a relatively narrow range of documents of interest. For example, a query having four terms logically ANDed together such as A and B and C and D will return only documents which include all four terms. Documents which match just three terms are simply not returned, even though they are probably of interest to the user. Other searching approaches, such as vector space models, which return weighted or ranked results, do not have this deficiency. Documents which match fewer terms are returned as well, ranked and presented after those which match more. Users find this preferable.

As many existing databases are only capable of boolean searches, there is a need for a system which serves as a middleman or front-end, taking a boolean database and providing users with a weighted searching experience. One can accomplish this by taking a user's query, deriving a number of broader queries, and then ranking each document according to the number of broader queries which returned it. One broadens a conjunctive query (one with ANDs) by eliminating terms from the query. Thus, a simple way to build a front-end is to take the terms of a query, search for each of them independently, and then rank a document by how many searches returned it. This process is equivalent to searching a vector space database which treats all terms equally. Unfortunately, single term searches tend to match a great many documents which makes their result lists quite large, creating a communication burden between the front-end and the boolean database. So one wishes to instead select other searches which are less broad. These have a lower communication burden, at the cost of some degradation in the quality of the resulting ranking. For most user queries, there are far more broadened queries possible than one can afford to use, so one must choose among them.

In general, when building a system which must choose among possibilities, the technique of making the choice in a random manner is known to often provide for simple implementation, and for characteristics which are predictable, even if rarely ideal.

It would therefore be desirable to provide a technique for generating search queries. It would also be desirable to provide a relatively simple yet effective technique for searching a database to find a particular entry in the database. It would also be desirable to provide a relevance rank search technique which can be used in a database which is only capable of boolean searches.

SUMMARY OF THE INVENTION

In accordance with the present invention, a system for generating database queries from an input text string includes a query string generator for providing a predetermined number of query strings, each of the predetermined number of query strings having a predetermined number of terms wherein each of the predetermined number of terms are randomly selected from the input text string. The system further includes a database search interface for receiving each of the predetermined number of query strings from the query string generator and for providing the query strings to a database. With this particular arrangement, a system for providing a list of documents related to the input text string is provided. In one particular embodiment, the query string generator generates a maximum of twelve query strings with each of the query strings having three words randomly selected from the input text string. The database search interface provides each of the twelve query strings to the database and the database returns a list of identifiers to the database search interface. The identifiers are unique pointers to entries in the database. The database search interface provides the identifiers to a ranking processor which counts the number of times each of the identifiers are returned from the database and places the identifiers in a predetermined order according to the number of times the identifiers are returned. The list thus corresponds to a relevance ranked list. If the input text string corresponds to the contents or a description of a particular document, then the ranking processor preferably provides a list having the document described by the input text string at or near the top of the list.

In accordance with a further aspect of the present invention, a method for searching a database having a plurality of documents stored therein includes the steps of (a) identifying an input string having a first plurality of terms, (b) randomly selecting a first number of terms from the first plurality of terms to form a first search string, the number of terms in the first search string being less than the number of terms in the input string and (c) randomly selecting a second number of terms from the input string, to form a second search string. The method further includes the steps of (d) identifying each of the documents in the database which contain the first search string, (e) identifying each of the documents in the database which contain the second search string (f) computing a rank value for each of the documents identified in steps (d) and (f) wherein each rank value for each respective document was identified and (g) listing each of the documents in a particular order, wherein the order is determined by the corresponding rank values. With this particular arrangement, a method for rapidly searching a database is provided. Depending upon the particular application, the number of terms in the second search string may or may not be equal to the number of terms in the first search string. In some applications it may be desirable to ensure that at least one of the terms in the second search string is not found in the first search string. By randomly selecting the particular terms to include in each of the search string a relatively simple yet effective method for locating entries in a database is provided. Since the terms are randomly selected, the method does not require any information regarding the format of document citations. In one particular embodiment, a plurality of search strings each having an equal number of randomly selected terms are used. Upon identification of the documents, a retrieval system may rapidly retrieve bibliographic citations from the database.

In accordance with a still further aspect of the present invention, a method for locating a document in a database includes the steps of forming a database query having a plurality of words with each of the plurality of words being randomly selected from an original document citation. The database is then searched using each of the database queries. Each document title which includes the words in the first database query is identified and the document or a corresponding document identifier is returned. In response to information returned from the database a new database query having a second plurality of words randomly selected from the original document citation is generated and the database is searched for document titles which include each of the words in the second database query and the corresponding document or document identification is returned. These steps may be repeated a predetermined number of times. The number of database queries which return a particular document is counted and the document which is most frequently returned is identified as the document most likely to be the document identified by the original citation. With this particular arrangement, a relatively simple and effective technique for automatically identifying documents in a database from an original document citation is provided. In one particular application, twelve database queries of three words each are used and the technique of the present invention presents a ranked list of citations in which the document title is the top choice in the ranked list of citations.

BRIEF DESCRIPTION OF THE DRAWINGS

The foregoing features of the invention, as well as the invention itself may be more fully understood from the following detailed description of the drawings, in which.

DESCRIPTION OF THE PREFERRED EMBODIMENTS

Figure 1:
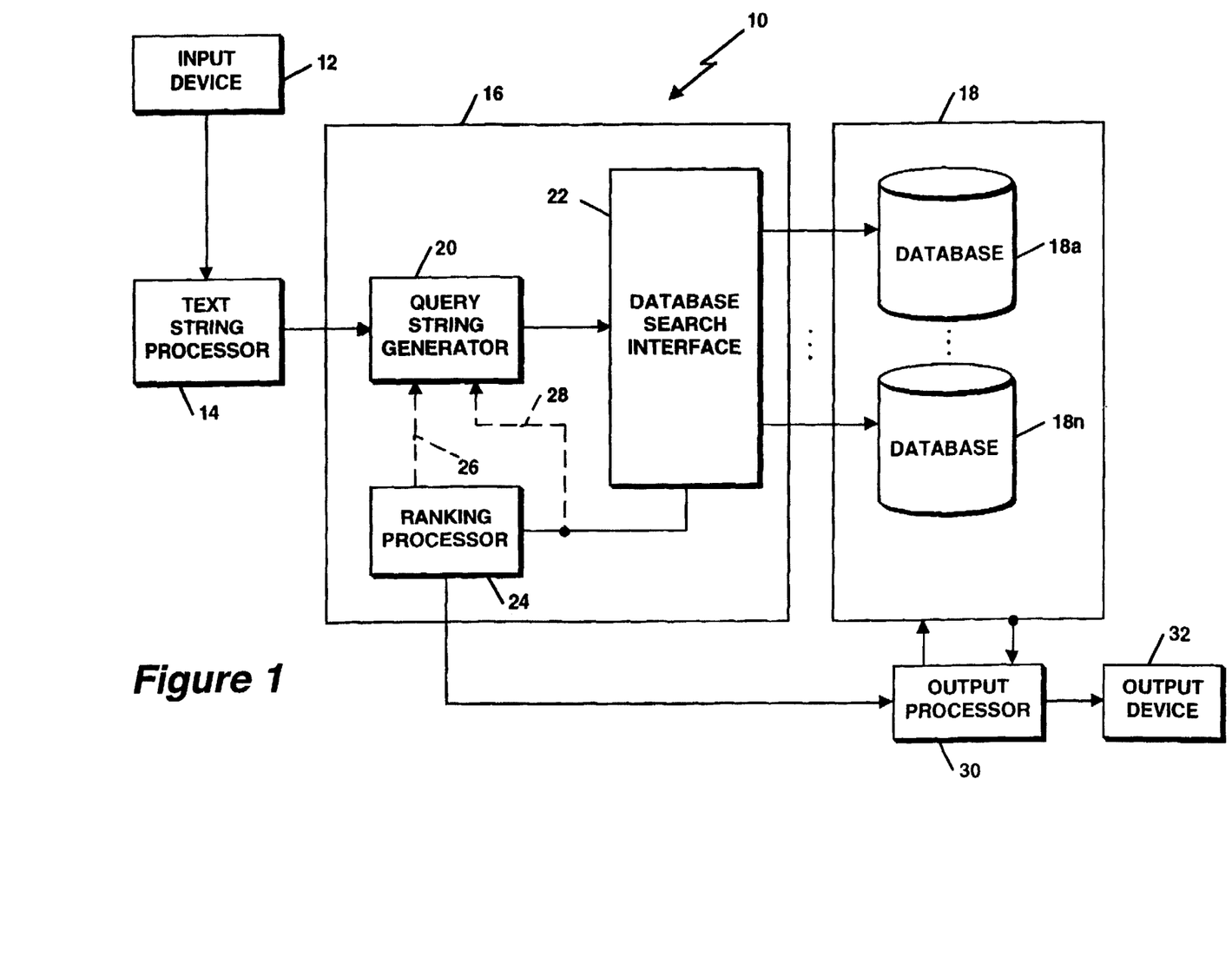
FIG. 1 is a block diagram of an information retrieval system.

Referring now to FIG. 1, an information retrieval system 10 includes an input device 12 coupled to a text string processor 14. Input device 12 may be provided, for example, as a personal computer or workstation having a keyboard and a graphical user interface (GUI) through which an input text string may be provided to the text string processor 14.

An input text may alternatively be provided to the text string processor 14 from some preexisting source. For example, input device 12 could include a scanner which receives an image fed thereto and redefines the image from one that is composed of lines, points and areas on a printed page to a digital image provided from an array of pixels. The image may, for example, correspond to a page of text or the image may correspond to a page having both text and pictures thereon. The scanner may also include optical character recognition (OCR) software which converts appropriate portions of the image provided by the scanner to text defined, for example, by ASCII codes. Thus the images may be scanned into the system and translated to text and modified as if the text were entered into the system by typing the text on a keyboard. Thus, in addition to providing text to the text string processor 14 via a keyboard, text may also be provided to the text string processor 14 from some preexisting source (e.g. a compact disc read only memory) and entered into the system via the keyboard, a GUI or by any means known to those of ordinary skill in the art for providing text to a computer system or other processor.

Text string processor 14 thus receives the input text string from input device 12 and conditions the input text string by removing punctuation marks, stop words and abbreviations from the input text string. The stop words may include a user defined class of words such as "of, the, and." In some applications, it may be desirable to provide a customized set of stop words as part of a stop word list. For example, when searching a library of computer science references, it may be desirable to include words such as "computer" in a stop word list since the search of a computer science library would typically result in a large number of documents being identified in the database due to the word "computer." Similarly, the term "DNA" may be added to a stop word list to prevent a large number of documents from being located in a database which includes a large number of documents related to biology. Thus, a stop word list may be optimized or customized to provide query strings which tend to focus the search results of a database search conducted in a particular subject area.

Text string generator 14 provides the conditioned text string to a search system 16 which generates query strings and searches one or more databases 18a–18n generally denoted 18 for documents which include the words in the query string. Search system 16 includes a query string generator 20 which receives the conditioned input text string from text string processor 14 and generates a plurality of query strings with each of the query strings having a plurality of words. The words are selected randomly from the conditioned input text string. In one particular embodiment, for example, text string processor 14 provides a bibliography text string (i.e. a document citation of the type to be used in a bibliography) to query string generator 20 and query string generator 20 generates a plurality of query strings with each of the query strings having three words. The words are selected randomly from the input text string and in one particular embodiment a maximum of twelve three-word sets are used. It will be appreciated by those of ordinary skill in the art, however, that in some applications fewer or more than twelve query strings may be used and that fewer or more than three words may be included in each query string.

Each of the query strings are provided to a database search interface 22 which initiates a search of the database 18 with each of the query strings. The database 18 returns a list of documents or document identifiers to database search interface 22. The document identifiers are unique pointers to database entries. The database search interface 22 provides the identifiers to a ranking processor 24 which counts the number of times each of the identifiers are returned. For example, if an identifier is returned by the database as a result of ten searches, the identifier has a count value of ten. Ranking processor 24 sorts the identifiers in a particular order according to the number of times the identifiers are returned from the database and provides a list of identifiers to an output processor 30.

In one embodiment, the list of identifiers may be directly fed back from database search interface 22 to query string generator 20 as indicated by path 28. Alternatively, the ranked list of identifiers may be provided from ranking processor 24 to query string generator 20 as indicated by path 26. In either case, the identifier information provided to query string generator from database search interface 22 or from ranking processor 24 may be used to modify the operation of the query string generator 20.

For example, either the number of words in the word set or the number of word sets provided by query string generator 20 may be adjusted according to the results returned from the database search interface 22. Alternatively, if a particular word in a query string is found to return particularly relevant documents from the database 18, then that particular word may be included in each of the word sets and the other words in the word set would be generated randomly. Thus, in this instance, a combination of particularly selected words and randomly selected words are used in the query strings provided by query string generator 20.

Other alternatives also exist. For example, the number of query strings and the number of words in each of the query strings may be varied based on the size of the initial input string or in response to information fed back from a server such as a library server to query string generator 20. Alternatively still, the search system may include a hit counter, which counts the number of times certain documents are returned in response to search queries and terminates the generation of search queries or the performance of searches as soon as a certain document is returned a predetermined number of times (e.g. ten times). Alternatively still if it is recognized that too many documents are being retrieved in response to one or more queries then the number of terms in the search strings may be increased (e.g. from three terms to four terms). Thus, it should be appreciated that it is not necessary to use the techniques of the present invention with a particular predetermined number of queries and that the number of queries and the number of words in the queries can be adjusted through the use of feedback.

It should also be noted that the input text string provided to query string generator 20 may correspond to documents or document identifiers or other text provided from database search interface 22 or any other means. Such input text strings may be fed to query string generator 20 directly or through text string processor 14. Thus, in some cases, input text strings may be provided to query string generator 20 without the use of input device 12.

In the case where document identifiers, rather than document entries themselves are returned by database 18, output processor 30 receives the ranked list of document identifiers from ranking processor 24 and accesses database 18 with the identifiers fed thereto to retrieve the actual names of the records provided as database entries in the ranked list. Database 18 returns the document names (e.g. the document citation) to processor 30 which provides the names to an output device 32. As used hereinbelow the term document refers to information stored in a database as a database entry or alternatively the term document refers to a document identifier which is a unique pointer to a database entry.

Figure 2:
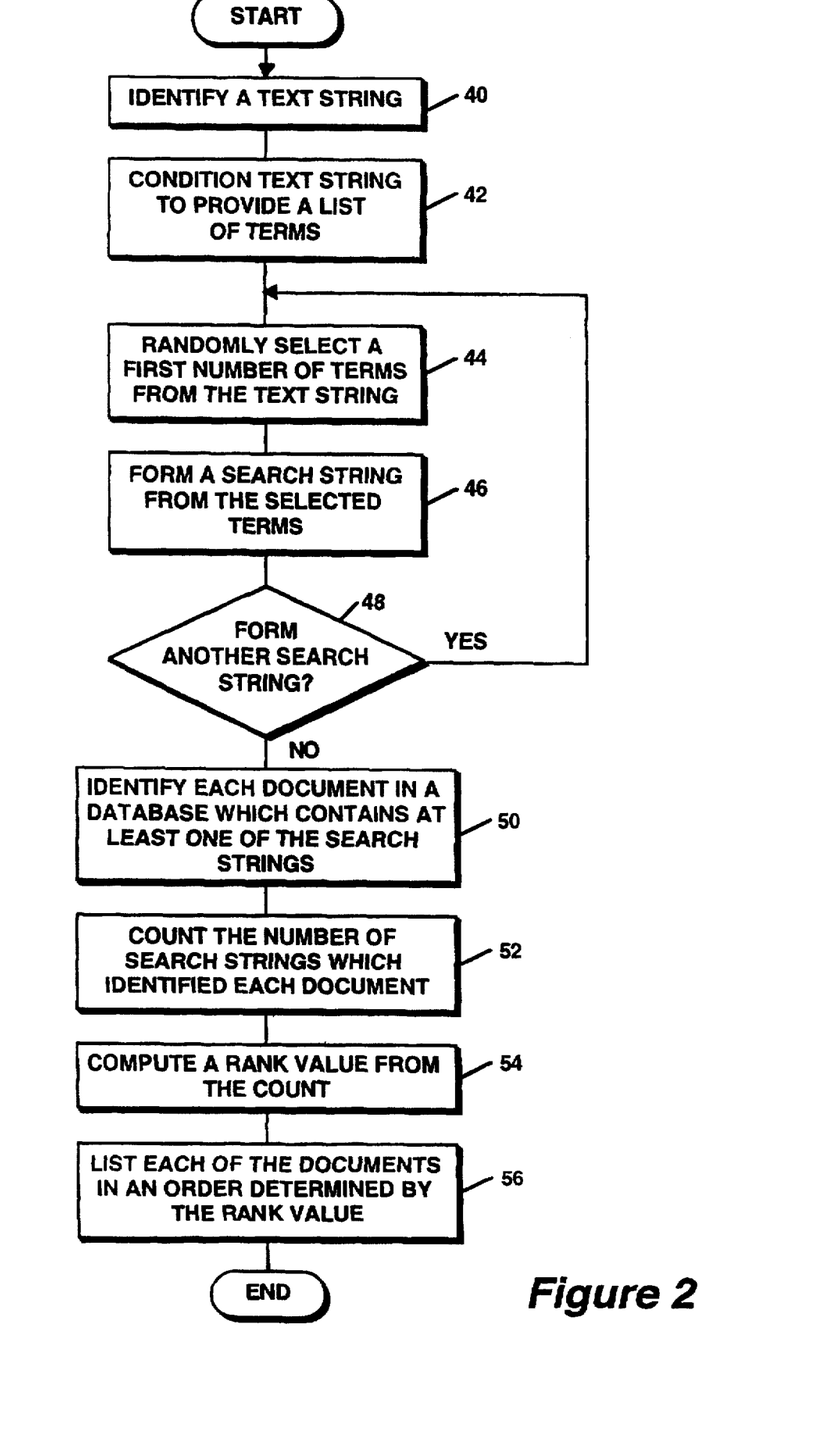
FIG. 2 is a flow diagram of the processing which takes place to generate a query string and retrieve a document from a database
Figure 3:
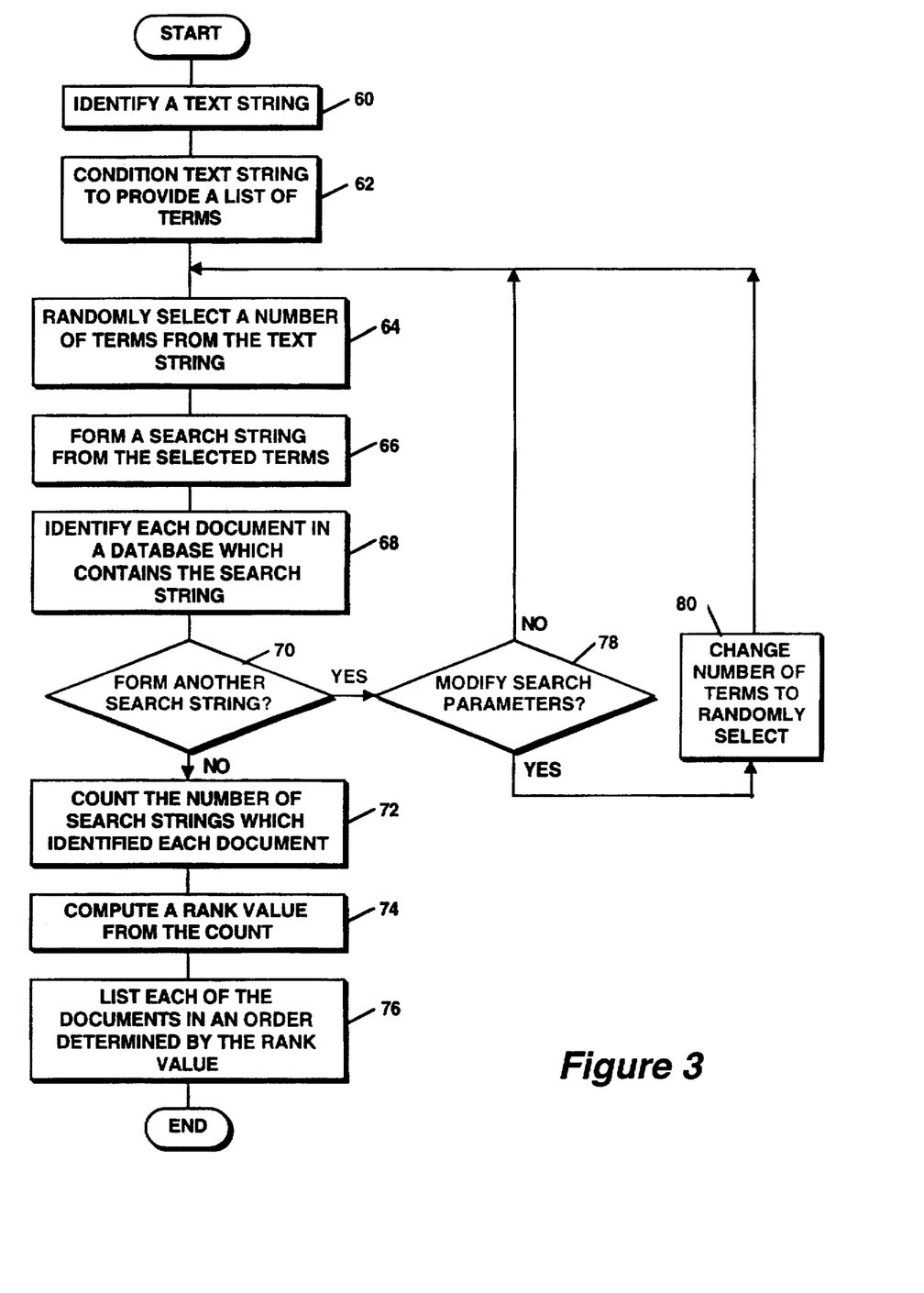
FIG. 3 is a flow diagram of the processing which takes place to generate a query string and retrieve a document from a database.

FIGS. 2 and 3 are both flow diagrams of the processing performed by apparatus 10 to form a query string to locate a document in a database. The rectangular elements (typified by element 40 FIG. 2), herein denoted "processing blocks," represent computer software instructions or groups of instructions. The diamond shaped elements (typified by element 48 FIG. 2), herein denoted "decision blocks," represent computer software instructions, or groups of instructions which affect the execution of the computer software instructions represented by the processing blocks. The flow diagrams do not depict syntax of any particular programming language. Rather, the flow diagrams illustrate the functional information one of ordinary skill in the art requires to generate computer software and/or hardware to perform the processing required of apparatus 10. It should be noted that many routine program elements, such as initialization of loops and variables and the use of temporary variables are not shown.

Turning now to FIG. 2, as shown in processing block 40 an input text string is identified. As described above in conjunction with FIG. 1, the input text string may be identified in a variety of ways including but not limited to having a user type or otherwise enter words into a search system. For example, the input text string may be provided by having a user specify a single point or a rectangular region in a document provided as a text image map. The text identified by the single point or included in the rectangular region would then be included in the input text string. Alternatively, a user may be able to highlight words in an image via a graphical user interface as is generally known (e.g. by pressing and releasing a button on a mouse). The text string may be provided as any type of text string including a bibliographic text string for example.

Next as shown in processing block 42, the text string may optionally be conditioned. Conditioning of the text string includes, for example, deleting or otherwise removing abbreviations and punctuation marks from the text string and deleting or otherwise removing all stop words from the text string. Stop words may include, for example, definite or indefinite articles (e.g. "the" and "a" respectively) and prepositions (e.g. at, from, by, in, of, under, etc. . . . ). One useful feature of a stop word list is that it acts to focus the resulting set of words in a conditioned text string which consequently results in a query string having a relatively focused set of words. Furthermore, the stop word list may be customized for particular applications. For example, as mentioned above, if it is desirable to search a database having store therein a plurality of computer science documents, then it may be desirable to add to the stop word list words such as "computer" which if included in a search string, may result in a relatively large number of documents being located in the database. In one particular embodiment, a stop word list that is optimized for a computer science library, includes over sixty terms. Those of ordinary skill in the art will recognize of course that any such stop word list may be customized for different types of databases and may include many more than or much fewer than sixty terms. It should be noted that in some applications it may be preferable to not condition the input text string.

Processing blocks 44, 48 and decision block 48 implement a loop in which one or more search strings are formed. As shown in processing block 44, one or more terms or words are randomly selected from the conditioned text string. Next, as shown in processing block 46 a search string is formed from the randomly selected words. Then in decision block 48 a decision is made as to whether another search string should be formed.

If decision is made in decision block 48 that a preferred number of search strings have been formed then processing proceeds to block 50. In processing block 50, each of the search strings (e.g. the twelve three-word sets) is used to identify each document in a database which contains at least one of the search strings. This may be accomplished, for example, by sending the search strings to a database search interface such as a computer science library search interface. The database returns a list of documents entered in the database.

As shown in processing block 52, the number of search strings which identified each of the returned documents is counted. Such a count may be made, for example, by counting the number of times each of the particular documents are returned. For example, if a document is returned by a database server in response to each of ten search strings, then this document identifier and consequently the corresponding document receives a count value of ten.

In one particular application related to identifying a document citation stored in a computer science database from an input document citation, the technique of the present invention was implemented using twelve search strings with each of the search strings having three words. This number of words in each search string as well as the total number of search strings was chosen empirically by recognizing that if the number of search strings decreased from twelve, the number of documents and the number of times each of the documents returned did not allow for a quality conclusion to be made concerning the particular document correctly referred to by a particular document citation identified as an input test string. However, increasing the number of search strings beyond twelve caused the search process to require a relatively large amount of time generally found to be unacceptable to users. Thus, a tradeoff must be made between providing too few search strings which leads to inadequate search results and providing too many search strings which leads to a relatively large amount of processing time and thus delay.

Additionally, in this particular application, it was found to be generally desirable to select three or more words for each search string since search strings having less than three words tended to identify a relatively large number of documents in a database. On the other hand, providing search strings having a relatively large number of words tended to locate relatively few documents in a database since each of the words were required to be included in any document located by the search string (i.e. each of the words in the search string are connected by a logical "AND" operation). Thus, a tradeoff must also be made between providing search strings having too few words and search strings having too many words.

Those of ordinary skill in the art will appreciate of course that in particular applications, the particular number of search strings and number of terms in each search string should be selected to provide preferred results and that each particular application may require a unique combination of the number of search strings and the number of words in each search string.

Next, after counting the number of search strings which identified each document, as shown in step 54 a rank value is computed for each of the documents. The rank value may correspond, for example, to a relevance ranking value of the documents in which the documents are sorted by the count value provided in processing block 52. In one embodiment in which document identifiers rather than the documents themselves are returned form the database, the identifiers are provided to a library server which uses the identifiers to retrieve the records or documents entered in the database.

The retrieved database records are then displayed to the user. Thus, the technique of the present invention provides a relatively simple method for rapidly retrieving bibliography strings including bibliography strings with errors from a database. Furthermore, the method does not require any knowledge of bibliography formats.

As an example of error handling performance, an original bibliography string: "D. Knuth, the art of computer programming volume 2 seminumerical algorithms 2nd edition addison-wesley 1981," was mutated to include two errors. Specifically the word "seminumerical" was misspelled as "seminumrical" and the word "algorithms" was misspelled as "algotihms." Applying the technique of the present invention to the mutated input bibliographic fifty times resulted in the correct library record being returned as the top scoring result 57.3 percent of the time and 99.8 percent of times the correct record was found in the list of returned documents.

Those of ordinary skill in the art will appreciate that in some applications, it may be desirable to vary the number of sets and the number of words in each set. For example, it may be desirable to vary the number of sets and the size of each set depending upon the size (e.g. the number of words in the input test string) of the input text string such as an input bibliography string rather than continuously using twelve word sets with each of the word sets having three words regardless of the length of the input text string. It may be of benefit both in speed and accuracy to use such a variance system. Thus, by varying the number of word sets and words (within some limits) depending upon the number words in the input test string, a faster and more accurate version of this technique of the present invention may be provided.

Referring now to FIG. 3, an alternate method for performing a database search includes processing block 60 in which an input text string is identified. As described above in conjunction with FIGS. 1 and 2, the input text string may be identified in a variety of ways including but not limited to having a user type or otherwise enter words into a search system.

Next as shown in processing block 62, the input text string is conditioned in a manner similar to that described above in conjunction with processing block 42 (FIG. 2).

Processing then proceeds to processing block 64 where one or more terms or words are randomly selected from the conditioned text string. Next, as shown in processing block 66 a search string is formed from the randomly selected words. Then in processing block 68 documents in a database which contains the search string are identified Then processing proceeds to decision block 70 where decision is made as to whether another search string should be formed. Such decision may be made based upon a variety of factors including but not limited to whether a predetermined maximum number of search strings has been generated, whether a particular document has been identified a predetermined number of times in response to a plurality of different search strings and whether a predetermined amount of time has been spent searching for a particular document citation.

If it is not desired to form any more search strings then processing flows to blocks 72–76 which are similar to processing blocks 52–56 described above in conjunction with FIG. 2.

If, on the other hand, it is desirable to form an additional search string, then processing flows to decision block 78 where decision is made as to whether the search parameters should be modified. The parameters which can be modified include but are not limited to the number of words to include in each search string, whether a particular word should be included in a search string and randomly selecting all other words or whether a particular word should be excluded from the search string even through the word was not previously included in a stop word list.

If decision is made to modify search parameters then processing proceeds to processing block 80. If decision is made not to modify the search parameters, then processing proceeds to processing block 64 and processing continues as described above.

Figure 4:
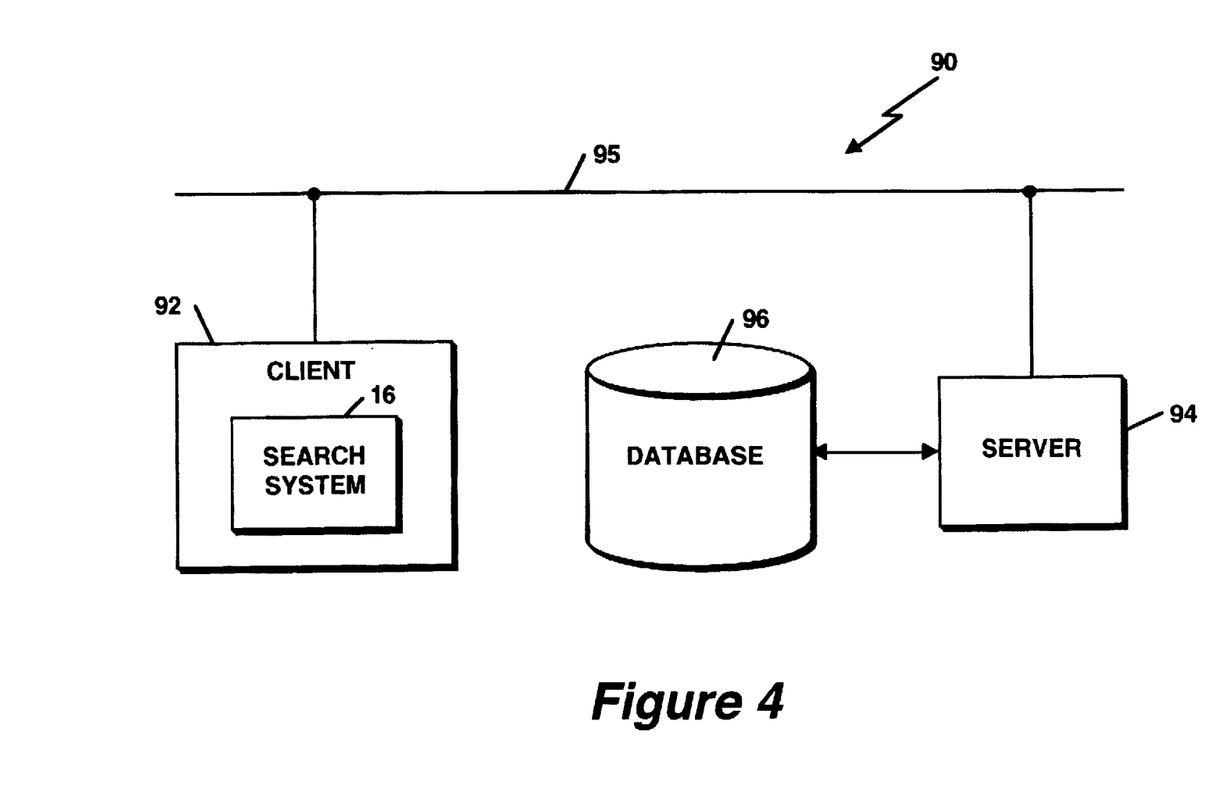
FIG. 4 is a block diagram of a client-server system with a client which includes an information retrieval system similar to the type described in FIG. 1.

Referring now to FIG. 4, a client-server system 90 includes a client node 92 which includes search system 16' which may be similar to search system 16 described above in conjunction with FIG. 1. Client node 92 is coupled to a server node 94 over a communications network 95. Thus a set of search strings may be formed by search system 16' and provided to server node 94 over network 95. Server 94 then searches database 96 to locate any documents or records via the search strings. After, locating such documents, server node 94 returns the results to client node 92.

As indicated heretofore, aspects of this invention pertain to specific "method functions" implementable on computer systems. Those skilled in the art should readily appreciate that programs defining these functions can be delivered to a computer in many forms; including, but not limited to: (a) information permanently stored on non-writable storage media (e.g., read only memory devices within a computer or CD-ROM disks readable by a computer I/O attachment); (b) information alterably stored on writable storage media (e.g., floppy disks and hard drives); or (c) information conveyed to a computer through communication media such as telephone networks. It should be understood, therefore, that such media, when carrying such information, represent alternate embodiments of the present invention.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

We claim:

1. A information retrieval system for retrieving information from a database, the system comprising:

a query string generator for receiving an input text string and for providing a plurality of query strings, each of the plurality of query strings having a plurality of terms wherein each of the plurality of terms are randomly selected from the input text string;

a database search interface coupled to the query string generator, the database search interface for receiving each of the plurality of query strings from the query string generator, for providing the plurality of query strings to the data base and for receiving search results from the database, the search results including a number of items; and a ranking processor for receiving the search results from the database search interface and for providing a rank value for each of the items in the search results.

2. The system of claim 1 further comprising:

an input device for receiving an input text string; and a text string processor coupled between the input device and the query string generator, the text string generator for receiving the input text string from the input device and for providing a conditioned text string to the query string generator.

3. The system of claim 2 wherein the database search interface is coupled to the query string generator and the search results are provided from said database search interface to said query string generator and said query string generator includes means for modifying a search parameter in response to the search results.

4. The system of claim 3 wherein the search parameter modified in response to the search results correspond to at least one of:

the number of every strings; and the number of terms in each of the query strings.

5. The system of claim 2 wherein the ranking processor is coupled to the query string generator and the search results are provided from said ranking processor to said query string generator and said query string generator includes means for modifying a search parameter of said query string generator.

6. The system of claim 5 wherein the search parameter corresponds to a first one of:

the number of words in a query string; and the number of query strings.

7. The system of claim 2 wherein:

each of the items in the search results correspond to a first one of:

a list of database entries; and a list of document identifiers, each of the document identifiers provided as a unique pointer to a corresponding entry in the database; and wherein each of the rank values are provided by counting the number of query strings which return a particular item in the search results and said ranking processor sorts the items in the search results in a predetermined order according to the respective rank values.

8. A method for searching a database having a plurality of documents stored therein, the method comprising the steps of:

(a) identifying an input text string having a first plurality of terms;

(b) randomly selecting a second plurality of terms from the first plurality of terms to form a first search string, the number of terms in the first search string being less than the number of terms in the input text string;

(c) randomly selecting a third plurality of terms from the input text string, to form a second search string, wherein the number of terms in the first search string are equal to the number of terms in the second search string and wherein at least one of the terms in the second search string is not found in the first search string;

(d) identifying each of the documents in the database which contain the first search string;

(e) identifying each of the documents in the database which contain the second search string;

(f) computing a rank value for each of the documents identified in steps (d) and (f) wherein each rank value for each respective document corresponds to the number of search strings with which the respective document was identified; and (g) listing each of the records in a predetermined order, wherein the order is determined by the corresponding rank values.

9. The method of claim 8 wherein after step (c) the method further comprises the step of:

repeating step (c) to provide a plurality of search strings.

10. The method of claim 9 wherein the number of terms in at least one of the plurality of search strings is not equal to the number of terms in the second search string.

11. A method for searching a database comprising the steps of:

(a) identifying a first text string having a first plurality of terms;

(b) randomly selecting a first predetermined number of terms from the first plurality of terms to form a first search string, the number of terms in the first search string being less than the number of terms in the first text string;

(c) randomly selecting a next predetermined number of terms from the first plurality of terms to form a next search string;

(d) repeating step (c) a predetermined number of times to provide a predetermined number of next search strings, wherein the first search string and each of the next search strings form a plurality of search strings;

(e) identifying each of a plurality of database entries which contain at least one of the plurality of search strings;

(f) computing a rank value for each of the database entries identified in step (e) wherein each rank value for each respective database entry corresponds to the number of search strings from the plurality of search strings with which the respective database entry was identified; and (g) listing each of the database entries in a predetermined order, wherein the order is determined by the corresponding rank values.

12. The method of claim 11, wherein the predetermined number of terms in a first one of the plurality of search strings is equal to the predetermined number of terms in a second one of the plurality of search strings.

13. The method of claim 12, wherein the predetermined number of terms in a third one of the plurality of search strings is different than the predetermined number of terms in a fourth one of the plurality of search strings.

14. The method of claim 11, wherein the step of identifying each of the plurality of database entries includes the step of identifying a plurality of document identifiers, each of the document identifiers provided as a unique pointer to a corresponding entry in the database.

15. The method of claim 14 further comprising the steps of:

providing at least one of the document identifiers to a processor: and retrieving from the database, via the processor the particular database entry represented by the document identifier.

16. The method of claim 15 further comprising the step of providing the document to an output device.

17. A method for searching a database comprising the steps of:

(a) identifying a first text string having a first plurality of terms;

(b) randomly selecting a first predetermined number of terms from the first plurality of terms to form a first search string, the number of terms in the first search string being less than the number of terms in the first text string;

(c) identifying each of a plurality of database entries which contain each of the terms in the first search string;

(d) randomly selecting a next predetermined number of terms from the first plurality of terms to form a next search string;

(e) identifying each of a plurality of database entries which contain each of the terms in the next search string;

(f) repeating steps (d) and (e) a predetermined number of times to provide a predetermined number of next search strings, wherein the first search string and each of the next search strings form a plurality of search strings;

(g) computing a rank value for each of the database entries identified in steps (c), (e) and (f) wherein each rank value for each respective database entry corresponds to the number of search strings from the plurality of search strings with which the respective database entry was identified; and (g) listing each of the database entries in a predetermined order, wherein the order is determined by the corresponding rank values.

18. The method of claim 17 wherein the predetermined number of times steps (d) and (e) are repeated is determined by the particular database entries identified in step (e).

19. A computer program product for use with an information retrieval system, the computer program product comprising:

a computer usable medium having computer readable program code means for identifying an input text string having a first plurality of terms;

a computer usable medium having computer readable program code means for randomly selecting a first predetermined number of terms from the first plurality of terms to form a first search string, the number of terms in the first search string being less than the number of terms in the input text string;

a computer usable medium having computer readable program code means for randomly selecting a second predetermined number of terms from the input text string, to form a second search string, wherein at least one of the terms in the second search string is not found in the first search string;

a computer usable medium having computer readable program code means for identifying each of the documents in the database which contain the first search string;

a computer usable medium having computer readable program code means for identifying each of the documents in the database which contain the second search string;

a computer usable medium having computer readable program code means for computing a rank value for each of the documents identified by said computer usable medium having computer readable program code means for identifying each of the documents in the database which contain the first search string and said computer usable medium having computer readable program code means for identifying each of the documents in the database which contain the second search string, wherein each rank value for each respective document corresponds to the number of search strings with which the respective document was identified; and a computer usable medium having computer readable program code means for listing each of the records in a predetermined order, wherein the order is determined by the corresponding rank values.

20. The computer program product of claim 19 further comprising a computer usable medium having computer readable program code means for modifying the predetermined number of terms selected by said computer readable program code means for randomly selecting a second predetermined number of terms from the input text string in response to the documents identified by said computer readable program code means for identifying each of the documents in the database which contain the first search string.

21. The computer program product of claim 20 further comprising a computer usable medium having computer readable program code means for receiving the input text string identified by said computer readable program code means for identifying an input text string having a first plurality of terms and for providing the input text string as a conditioned input text string.

* * * * *

UNITED STATES PATENT AND TRADEMARK OFFICE
CERTIFICATE OF CORRECTION

PATENT NO.   : 5,802,515
DATED        : Sep. 1, 1998
INVENTOR(S)  : Adar et al.

It is certified that error appears in the above-identified patent and that said Letters Patent is hereby corrected as shown below:

col. 10, line 43, delete " A " and insert -- An --.

col. 12, line 43, delete " : " and insert -- ; --.

Signed and Sealed this

Ninth Day of March, 1999

Attest:

Q. TODD DICKINSON

Attesting Officer

Acting Commissioner of Patents and Trademarks